(12) United States Patent
Schröter

(10) Patent No.: US 12,104,734 B2
(45) Date of Patent: Oct. 1, 2024

(54) RECEIVING UNIT OF A COUPLING DEVICE FOR FLUID LINES

(71) Applicant: Fränkische Industrial Pipes GMBH & CO. KG, Königsberg (DE)

(72) Inventor: Sören Schröter, Königsberg (DE)

(73) Assignee: Fränkische Industrial Pipes GMBH & CO. KG, Königsberg (DE)

( * ) Notice: Subject to any disclaimer, the term of this patent is extended or adjusted under 35 U.S.C. 154(b) by 0 days.

(21) Appl. No.: 18/025,116

(22) PCT Filed: Aug. 31, 2021

(86) PCT No.: PCT/EP2021/073956
§ 371 (c)(1),
(2) Date: Mar. 7, 2023

(87) PCT Pub. No.: WO2022/049050
PCT Pub. Date: Mar. 10, 2022

(65) Prior Publication Data
US 2023/0358353 A1    Nov. 9, 2023

(30) Foreign Application Priority Data
Sep. 7, 2020 (DE) .................... 10 2020 211 212.6

(51) Int. Cl.
*F16L 37/14* (2006.01)
*F16L 37/35* (2006.01)
*F16L 37/42* (2006.01)

(52) U.S. Cl.
CPC ............. *F16L 37/144* (2013.01); *F16L 37/35* (2013.01); *F16L 37/42* (2013.01)

(58) Field of Classification Search
CPC .......... F16L 37/42; F16L 37/35; F16L 37/144
See application file for complete search history.

(56) References Cited

U.S. PATENT DOCUMENTS

| 2,322,877 A | * | 6/1943 | Parker | ..................... F16L 37/23 251/149.6 |
| 2,919,935 A | * | 1/1960 | Nyberg | ................... F16L 37/42 251/149.6 |

(Continued)

FOREIGN PATENT DOCUMENTS

| DE | 20011308 U1 | * | 11/2000 | .............. F16L 37/02 |
| DE | 10013488 A1 | * | 10/2001 | ............ F16L 37/084 |

(Continued)

OTHER PUBLICATIONS

NPL "Frasier" ("The benefits of wave springs" by Frasers, publicly available since May 3, 2016) (Year: 2016).*

(Continued)

*Primary Examiner* — David Colon-Morales
(74) *Attorney, Agent, or Firm* — Kilpatrick Townsend & Stockton LLP

(57) ABSTRACT

A receiving unit of a coupling device for fluid lines, and the coupling device. The receiving unit comprises a closure element which fluidically seals the fluid flow channel in a closed position. The closure element is preloaded into the closed position using a spring element. The closure element comprises a perforation-free cylindrical portion. The entire spring element, in the release position of the closure element, is arranged within a region that is completely overlapped by the cylindrical portion along the entire longitudinal extent thereof, as viewed in a radial direction of the cylindrical portion.

17 Claims, 9 Drawing Sheets

(56) References Cited

U.S. PATENT DOCUMENTS

| | | | |
|---|---|---|---|
| 3,052,261 A | 9/1962 | Nyberg | |
| 3,566,918 A * | 3/1971 | Rauen | F16L 37/113 137/614.04 |
| 3,763,985 A * | 10/1973 | Strauss | B41J 3/50 400/479.2 |
| 4,362,326 A * | 12/1982 | F'Geppert | F16L 37/35 285/321 |
| 4,465,096 A * | 8/1984 | Voisine | F16L 37/088 137/614.04 |
| 4,696,326 A * | 9/1987 | Sturgis | F16L 37/32 251/149.6 |
| 4,700,743 A | 10/1987 | L'Henaff et al. | |
| 5,211,197 A * | 5/1993 | Marrison | F16L 37/35 251/149.6 |
| 5,423,515 A * | 6/1995 | Ozaki | F16L 37/40 251/149.6 |
| 5,540,250 A * | 7/1996 | Mullins | F16L 37/42 251/149.6 |
| 5,607,139 A * | 3/1997 | Kjellberg | F16L 37/23 251/149.6 |
| 6,588,452 B2 * | 7/2003 | Marquart | F16L 37/35 137/614 |
| 7,168,449 B2 * | 1/2007 | Giagnoli | F16L 37/35 137/614.04 |
| 9,409,108 B2 * | 8/2016 | Lin | B01D 35/15 |
| 9,528,650 B2 * | 12/2016 | Tiberghien | F16L 37/138 |
| 9,611,964 B2 * | 4/2017 | Nezu | F16L 37/0885 |
| 9,752,713 B2 * | 9/2017 | Tiberghien | F16L 37/42 |
| 10,125,908 B2 * | 11/2018 | Kujawski, Jr. | F16L 37/413 |
| 10,502,350 B2 * | 12/2019 | Xu | F16L 37/42 |
| 10,718,454 B2 * | 7/2020 | Decker | F16L 37/086 |
| 10,883,641 B2 * | 1/2021 | Bonomi | F16L 37/23 |
| 10,975,982 B2 * | 4/2021 | Wilhelm | F16D 39/00 |
| 11,821,558 B2 * | 11/2023 | Janik | F16L 37/144 |
| 11,873,933 B2 * | 1/2024 | Kouda | F16L 37/23 |
| 2005/0101939 A1 * | 5/2005 | Mitchell | A61M 39/26 604/533 |
| 2010/0276922 A1 * | 11/2010 | Rehder | F16L 37/0841 285/82 |
| 2011/0101675 A1 * | 5/2011 | Smith, III | F16L 25/01 285/119 |
| 2014/0083542 A1 * | 3/2014 | Chen | F16L 37/22 137/798 |
| 2017/0307123 A1 * | 10/2017 | Liu | F16L 37/23 |

FOREIGN PATENT DOCUMENTS

| | | | |
|---|---|---|---|
| EP | 3763985 A1 * | 1/2021 | F16L 37/35 |
| FR | 2166770 A5 * | 1/1972 | |
| WO | 2019190658 A1 | 10/2019 | |

OTHER PUBLICATIONS

German Application No. 10 2020211212.6, "Office Action", May 19, 2021, 6 pages.

International Application No. PCT/EP2021/073956, "International Search Report and Written Opinion", Oct. 27, 2021, 15 pages.

* cited by examiner

RECEIVING UNIT OF A COUPLING DEVICE FOR FLUID LINES

CROSS REFERENCE TO RELATED APPLICATION

This application is a U.S. national phase of International Patent Application No. PCT/EP2021/073956 filed on Aug. 31, 2021, which claims priority to German Patent Application No. 10 2020 211 212.6, filed in Germany on Sep. 7, 2020. The entire contents of both applications are hereby incorporated herein by reference.

The present invention relates to a receiving unit of a coupling device for fluid lines, wherein the receiving unit is designed to be connected at a first end to a fluid line, which does not belong to the receiving unit, and defines a fluid flow channel in the interior thereof, wherein the receiving unit comprises a closure element which, in a closed position, is designed to fluidically seal the fluid flow channel of the receiving unit between the first end and a second end of the receiving unit, which is opposite the first end in relation to a main flow direction along the fluid flow channel, wherein the closure element is displaceable between the closed position and a release position. Furthermore, the present invention relates to a coupling device which comprises the receiving unit according to the invention and a plug-in unit.

Coupling devices are known from the prior art which are designed to couple two fluid lines to one another. However, this usually results in the problem that the fluid dynamics at the coupling point are significantly worse than in the rest of the fluid line, since the components of the coupling device can cause turbulence and dead zones in the fluid to be conducted. In particular when using elements which are preloaded into a specific position by spring elements, a spring element used can cause a severe disruption of the fluid flow in the region of the coupling device.

Furthermore, the presence of dead zones can result in an accumulation of fluid therein, which can then escape from the coupling device in an uncontrolled manner when it is separated. This can result in contamination of the environment or, for example in the case of hazardous substances conveyed within the fluid line, in damage to the environment and/or to the operator of the coupling device.

It is therefore the object of the present invention to provide a receiving unit for fluid lines, the flow properties of which are improved, and at the same time corresponding dead zones are reduced.

According to the invention, this object is achieved by a receiving unit for fluid lines, wherein the receiving unit is designed to be connected at a first end to a fluid line, which does not belong to the receiving unit, and defines a fluid flow channel in the interior thereof, wherein the receiving unit comprises a closure element which, in a closed position, is designed to fluidically seal the fluid flow channel of the receiving unit between the first end and a second end of the receiving unit, which is opposite the first end in relation to a main flow direction along the fluid flow channel, wherein the closure element is displaceable between the closed position and a release position, wherein the closure element is preloaded into the closed position using a spring element, wherein the closure element comprises a substantially cylindrical portion which is free of perforations, wherein the entire spring element, in the release position of the closure element, is arranged within a region which is completely overlapped by the cylindrical portion along the entire longitudinal extent thereof, as viewed in a radial direction of the cylindrical portion, wherein the closure element further comprises a section provided with perforations, wherein the perforations of the section are formed as window-like openings which fluidically connect an interior of the closure element to an exterior of the closure element.

The arrangement of the receiving unit according to the invention makes it possible that the spring element, at least in the release position of the associated closure element, in which fluid is allowed to flow through the receiving unit, is arranged separately from the fluid flowing through the receiving unit, whereby an improved fluid flow through the receiving unit can be achieved. Furthermore, it can be prevented in this way that fluid collects in the region in which the spring is arranged and emerges in an uncontrolled manner from the receiving unit when the coupling device, i.e. the receiving unit of a complementary plug-in unit, is released. The closure element can be constructed in multiple parts, in particular in two parts, it being possible for the individual components of the closure element to be connected to one another, for example via matching internal and external threads, in order to simplify assembly of the closure element.

The receiving unit according to the invention can be designed in particular to be able to be connected to a standard plug-in unit, in particular a standardised plug-in unit.

It should already be mentioned at this point that the receiving unit or the entire superordinate coupling device can, of course, be designed both for connecting smooth pipes and for connecting corrugated pipes. In this case, it makes sense if connecting portions of the coupling device, to which the coupling device is to be connected to corresponding fluid lines, have a spigot element provided with a sawtooth profile. In addition, at least one groove can be provided on such a spigot element, in which groove a sealing element, such as an O-ring, can be accommodated in order to seal against the fluid line.

For better guidance in the receiving unit, the closure element can have a plurality of ribs, in particular at least three ribs, on the outer circumference thereof, which protrude radially outwards from the closure element and can come into contact at their radially outer end with a corresponding portion of the surrounding receiving unit.

In particular, the spring element can be a wave spring. Compared to a spiral spring, a wave spring requires less installation space with the same spring force.

Advantageously, the spring element can be arranged radially outside of the cylindrical portion. Thus, the cylindrical portion can shield the spring element from the radially inner flow channel on the inner circumference of the spring element.

In a development of the present invention, the perforations in the section can be designed as four window-like openings. In particular, the perforations are arranged such that, when the closure element has left the closed position thereof, fluid flows through the perforations from radially outside the closure element to radially inside, or vice versa in the case of an opposite direction of flow. The cylindrical, perforation-free portion of the closure element can also interact with the receiving unit, for example a projection of the receiving unit, such that substantially all of the fluid that reaches the region of the perforations in the closure element is conducted through the perforations into the interior of the closure element, instead of flowing radially outwards past said closure element.

The receiving unit may have a housing in which the closure element is accommodated, wherein the housing may have a radially inwardly extending projection that is designed to come into contact with the closure element, in particular with a sealing element arranged on the closure element, in the closed position of the closure element. The sealing element can be designed separately from the closure element, for example as an O-ring. As already described above, this projection can be designed to come into contact both with the sealing element in the closed position of the closure element and with the cylindrical portion of the closure element, in particular in the release position of the closure element. In this case, the projection can in particular be designed integrally with the housing of the receiving unit.

For this purpose, the projection can be provided with an oblique flank, so that the projection results in a gradually reducing cross section of the interior of the housing in a direction from the release position into the closed position of the closure element. A projection of this type allows the closure element to be guided and centred, for example when moving into the closed position. The oblique flanks can provide the sealing element with a defined sealing surface for contact, so that sealing can be ensured by the sealing element. In addition, the oblique flanks can direct the fluid flow from radially outside through the perforations of the closure element to radially inside and thus improve it.

The housing of the receiving unit can be designed in multiple parts, in particular in two parts. In particular, the housing of the receiving unit can be designed in multiple parts, viewed in an axial direction of the movement axis of the closure element between the closed position and the release position. In other words, the housing of the receiving unit can, for example, comprise a substantially tube-shaped portion, which has the radially inwardly protruding projection, and also comprise a closing element, at which a connecting portion, in particular a spigot element, is designed with the first end of the receiving unit for connection to a fluid line. The division of the housing into a tube-shaped portion and a closing element can make it possible for the closure element to be inserted into the receiving unit partially from one side and partially from the other side of the receiving unit and to be mounted inside the receiving unit.

A first housing part, which comprises the first end, can be connected in a fluid-tight manner to a second housing part, which comprises the second end, in particular using a spin welding process or a laser welding process. For example, the closing element described above can be connected in a fluid-tight manner to the tube-shaped portion on an end face thereof.

Advantageously, at least one protruding web can be arranged on the housing, which is designed to define the release position of the closure element in contact with the closure element. The release position of the closure element can be defined in particular by the contact of the closure element against the free end of the at least one web. The webs may, for example, be arranged circumferentially around an orifice of a fluid flow channel formed radially inside of the spigot element and extend from there towards the tube-shaped portion of the housing of the receiving unit. This means that, when the closure element is in the release position, fluid that emerges from the fluid flow channel inside the spigot element flows radially outwards between the webs, flows around the portion of the closure element, on which the sealing element is arranged, and flows from there through the through-openings of the closure element radially inwards and through the closure element from the receiving unit.

In a second aspect, the present invention relates to a coupling device for fluid lines, comprising a receiving unit according to the invention and a plug-in unit, which is designed to be connected at a first end to a further fluid line, which does not belong to the plug-in unit, and defines a fluid flow channel in the interior thereof, wherein the plug-in unit has a contact surface which is designed to come into contact with a corresponding counter-contact surface of the closure element of the receiving unit when the plug-in unit is inserted into the receiving unit, so that, when the insertion of the plug-in unit is continued into the receiving unit, the closure element of the receiving unit is displaced from the closed position thereof in the direction of the release position, wherein a sealing device is arranged on the receiving unit and/or the plug-in unit, which sealing device is designed in a way between the receiving unit and the plug-in unit such that the fluid flow channel of the receiving unit and/or the plug-in unit is fluidically sealed from an exterior of the coupling device, wherein the sealing device is arranged such that a fluidic seal is established between the receiving unit and the plug-in unit before the contact surface of the plug-in unit comes into contact with the counter-contact surface of the closure element.

It should be explicitly pointed out that, with regard to the coupling device according to the invention and the receiving unit included therein, all the features, effects and advantages described in relation to the receiving unit according to the invention may be applicable, and vice versa. As already indicated above, the direction of flow from the receiving unit to the plug-in unit is primarily discussed in this description for the sake of simplicity, but the receiving unit according to the invention and the coupling device according to the invention are of course also suitable for an opposite flow direction. The coupling device can be designed in particular for pressures of a fluid flowing therein of 2 bar to 5 bar.

Advantageously, the counter-contact surface of the closure element of the receiving unit can be designed as a collar protruding from the closure element of the receiving unit in the radial direction. Due to the radially protruding collar, which is designed in particular on an end face of the cylindrical portion of the closure element facing the plug-in unit, a surface region of the counter-contact surface can be increased and thus, for example, the contact surface of the plug-in unit can be prevented from sliding off the counter-contact surface. The spring element, which preloads the closure element of the receiving unit into the closed position, can be supported on the side of the collar which is opposite the counter-contact surface for contacting the plug-in unit. The other end of the spring element of the receiving unit can be supported, for example, on the projection of the housing of the receiving unit, in particular on a flank of the projection that extends in the radial direction towards the housing of the receiving unit.

In one development of the present invention, the plug-in unit can also comprise a closure element which, in a closed position, is designed to fluidically seal the fluid flow channel of the plug-in unit between a second end, which is opposite the first end in relation to a main flow direction along the fluid flow channel, and the first end of the plug-in unit, wherein the closure element of the plug-in unit is displaceable between the closed position and a release position, wherein the closure element of the plug-in unit is preloaded into the closed position using a spring element. The spring element can be arranged on the side of the closure element of the plug-in unit pointing towards the first end. The spring element of the plug-in unit can also be a wave spring.

Analogous to the above-described multi-part structure of the housing of the receiving unit, a housing of the plug-in unit can also have a multi-part, in particular two-part, design. Here, too, a substantially tube-shaped portion can be connected in a fluid-tight manner at one end face to a closing element, on which a spigot element for connection to a fluid line is arranged.

The plug-in unit can, in particular on the end face of the tube-shaped portion of the housing of the plug-in unit opposite the closing element, have a radially inwardly protruding projection which, as described above in relation to the receiving unit, can have an oblique flank over which the closure element of the plug-in unit can be centred and which offers a sealing element arranged on the closure element of the plug-in unit with a corresponding contact surface.

The closure element of the plug-in unit can have an increasing diameter in a direction from the second end of the plug-in unit to the first end of the plug-in unit. For example, the closure element of the plug-in unit can comprise a first substantially cylindrical portion, on the outer circumference of which the sealing element for sealing against the housing of the plug-in unit is arranged. Viewed in the direction of flow of the fluid from the receiving unit to the plug-in unit, the first cylindrical portion can be adjoined by a conical portion, over which an outer diameter of the closure element of the plug-in unit increases. This can be followed by a second substantially cylindrical portion, the outer diameter of which is larger than that of the first cylindrical portion. Sector-like perforations can be provided in the region of the conical portion, so that the second cylindrical portion, which is designed as a ring, can only be connected to the first cylindrical portion via remaining webs. This means that, in the release position of the closure element of the plug-in unit, fluid can flow past the outer circumference of the first cylindrical portion of the closure element of the plug-in unit and then flow radially inwards through the second cylindrical portion via the perforations in the conical portion.

This nozzle-like shape of the closure element of the plug-in unit can largely reduce turbulence in the fluid flow in the region of the plug-in element, so that a high flow rate through the plug-in element can be achieved.

If the spring element rests against the free end face of the second cylindrical portion, the fluid also flows through the spring element radially on the inside.

Furthermore, the closure element of the receiving unit can have a central bolt which has a free end which extends in the direction of the second end of the receiving unit and which is designed to rest, in particular with the free end thereof, against a bolt-receiving surface formed on the closure element of the plug-in unit upon insertion of the plug-in unit into the receiving unit, so that, when the insertion of the plug-in unit continues into the receiving unit, the closure element of the plug-in unit or the closure element of the receiving unit is displaced from the closed position thereof in the direction of the release position. The bolt-receiving surface can be designed in particular on a free end face of the first cylindrical portion of the closure element of the plug-in unit.

The bolt of the closure element of the receiving unit and/or the bolt-receiving surface of the closure element of the plug-in unit can be dimensioned such that the bolt only comes into contact with the bolt-receiving surface when the housing of the plug-in unit has come into contact with a sealing device which is arranged on the receiving unit and which is designed to seal between the receiving unit and the plug-in unit, so that fluid can be prevented from leaking out of the coupling device to an exterior.

A spring force of the spring element, which acts on the closure element of the plug-in unit, can be lower, in particular significantly lower, than a spring force of the spring element, which acts on the closure element of the receiving unit, so that, when the insertion of the plug-in unit takes place into the receiving unit, first the closure element of the plug-in unit is displaced from the closed position thereof into the release position thereof and then, when the insertion of the plug-in unit is continued into the receiving unit, the closure element of the receiving unit is displaced from the closed position thereof into the release position thereof. In this way, assuming that the fluid flow direction runs through the coupling device from the receiving unit to the plug-in unit, it can be ensured that a fluid flow through the receiving unit and thus through the coupling device is only permitted when the plug-in unit is already completely open, i.e. the closure element of the plug-in unit is in the release position.

The coupling device can, for example, be secured in the coupled state thereof between the receiving unit and the plug-in unit via a securing element so as to prevent the plug-in unit from releasing from the receiving unit.

The receiving unit and/or the plug-in unit and/or the respective closure element can be made from plastics material, in particular from polyamide, advantageously from PA6 GF30.

Hereinafter, the present invention will be described in greater detail using preferred embodiments with reference to the accompanying drawings, in which.

Figure 1:
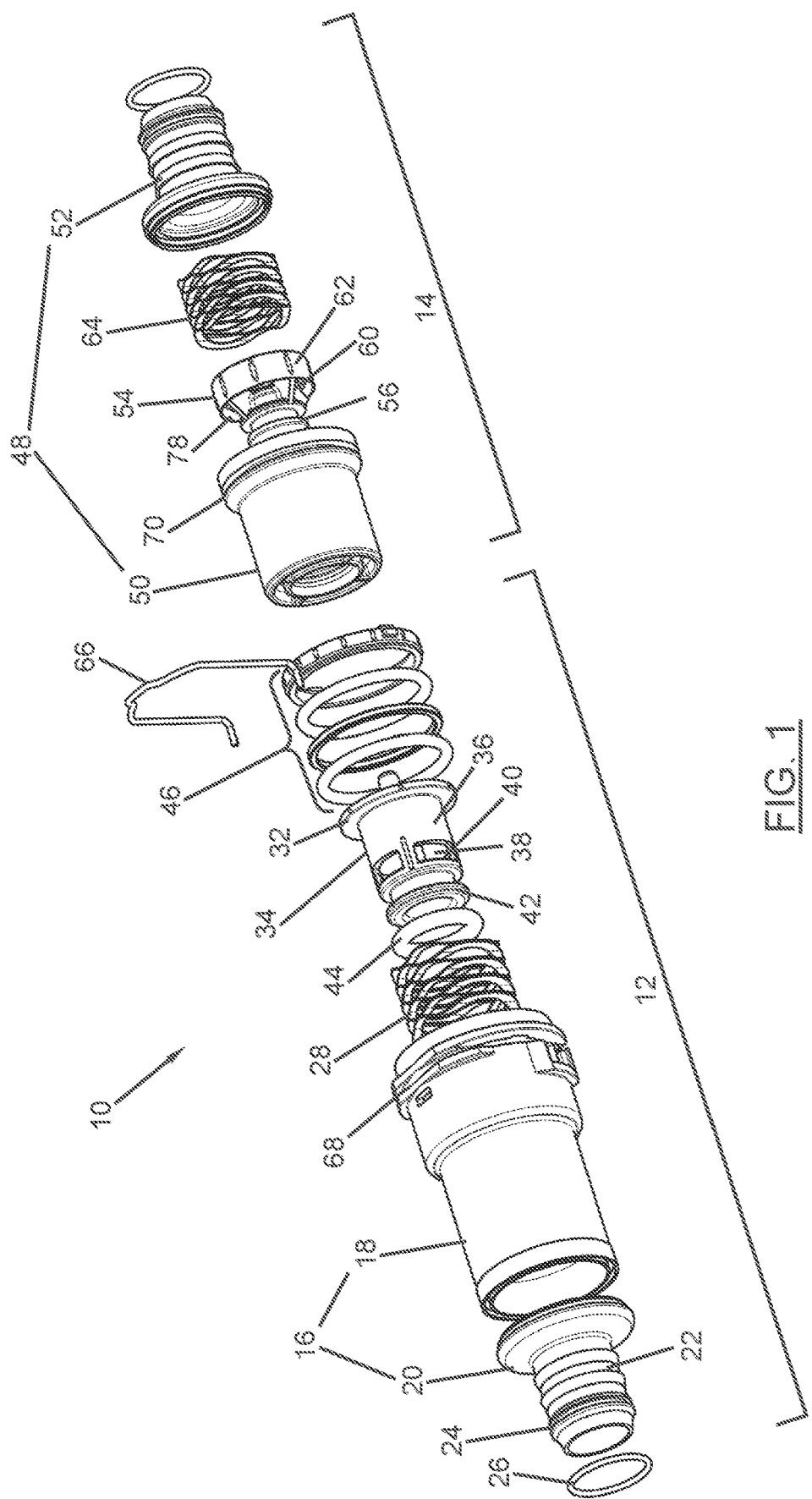
FIG. 1 is an exploded perspective view of a coupling device according to the invention according to a first embodiment.

In FIG. 1, a coupling device according to the invention is generally designated by the reference numeral 10 according to a first embodiment. The coupling device 10 comprises a receiving unit 12 and a plug-in unit 14. The receiving unit 12 comprises a housing 16, which in turn comprises a substantially tube-shaped portion 18 and a closing element 20, with the closing element 20 being able to be connected to an end face (shown on the left in FIG. 1) of the tube-shaped portion 18. In the first embodiment, a spigot element 22 is formed on the closing element 20, with which a fluid line, such as a smooth pipe, can be coupled. A groove 24 is provided on the spigot element 22 in order to accommodate a sealing element 26, in this case an O-ring.

Arranged inside the housing 16 of the receiving unit 12 is a wave spring 28 which at one end bears against a projection 30 (see FIG. 2) of the tube-shaped portion 18 of the housing 16 of the receptacle unit which projects radially inwards and at the other end thereof is supported against a collar 32 of a closure element 34.

The closure element 34 comprises a cylindrical portion 36 adjoining the collar 32, which cylindrical portion is designed without perforations and which in turn is adjoined (on the left in FIG. 1) by a portion 40 provided with perforations 38. On the side of the perforated portion 40 of the closure element 34 which is opposite to the cylindrical portion 36, a sealing element receiving portion 42 is provided, which is designed to receive a sealing element 44. The sealing element 44 is designed to seal the closure element 34 from an inner wall, in particular the projection 30, of the housing 16 of the receiving unit 12.

In FIG. 1, a sealing device 46 is shown to the right of the closure element 34 of the receiving unit 12, which is arranged on an inside of the housing 16 or the tube-shaped portion 18 of the housing 16 of the receiving unit 12, in order to seal the receiving unit 12 from the plug-in unit 14, so that fluid can be prevented from passing outwards between the receiving unit 12 and the plug-in unit 14.

The plug-in unit 14 comprises a housing 48 which comprises a substantially tube-shaped portion 50 and a further closing element 52, the further closing element 52 being designed generally analogously to the closing element 20 of the receiving unit 12. A closure element 54 of the plug-in unit 14 is arranged within the housing 48 of the plug-in unit 14 (see also FIG. 3), which closure element comprises a first cylindrical portion 56, on which a sealing element 58 is accommodated, a conical portion 60, along which the outer diameter of the closure element 54 of the plug-in unit 14 is increased, and a second cylindrical portion 62. The free end (the end shown on the right in FIG. 1) of the second cylindrical portion 62 of the closure element 54 of the plug-in unit 14 is in contact with a wave spring 64 of the plug-in unit 14, which, supported against the further closing element 52 of the plug-in unit 14, preloads the closure element 54 (to the left in FIG. 1).

FIG. 1 also shows a securing element 66 which, when the receiving unit 12 and the plug-in unit 14 are in a completely connected state, can be releasably inserted in a radial direction relative to the coupling device 10 through a receiving space 68 in the receiving unit 12 and into a receiving groove 70 in the plug-in unit 14 in order to prevent an axial displacement of the plug-in unit 14 relative to the receiving unit 12 and thus a release of the coupling device 10.

Figure 2:
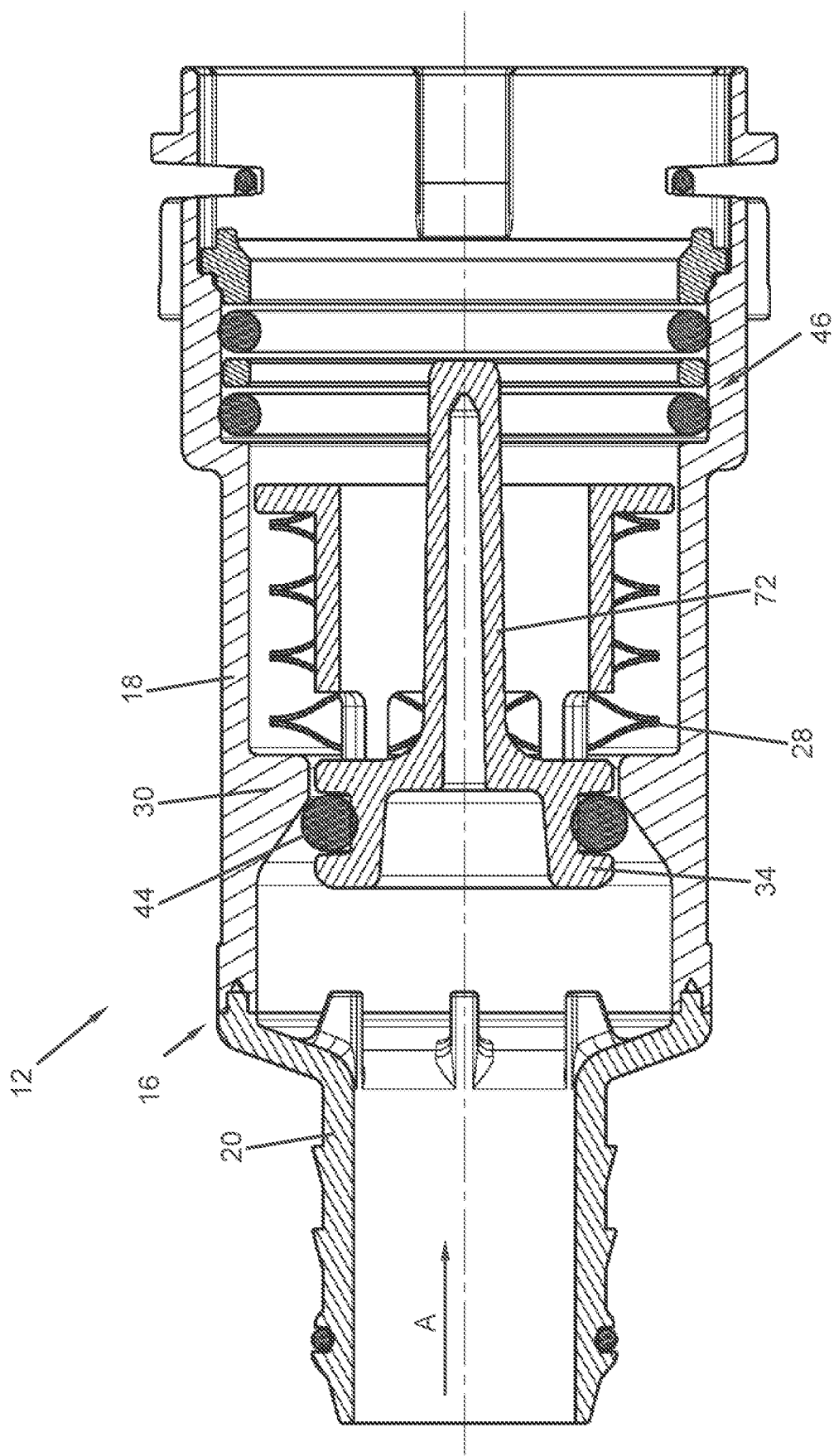
FIG. 2 is a side cross-sectional view of a receiving unit according to the invention according to the first embodiment.

FIG. 2 now shows an enlarged side cross-sectional view of the receiving unit 12 in the assembled state thereof. It can be seen here that the wave spring 28 preloads the closure element 34 of the receiving unit 12 into the closed position shown in FIG. 2. In this closed position of the closure element 34 of the receiving unit 12, the sealing element 44 creates a fluidic seal between the closure element 34 and the projection 30 of the housing 16 of the receiving unit 12. Thus, fluid, which is assumed herein to flow in the direction of flow indicated by arrow A, is prevented from flowing past the sealing element 44.

It can also be seen in the side cross-sectional view from FIG. 2 that the closure element 34 has a central bolt 72 which protrudes in the direction of that side of the receiving unit 16 via which the plug-in unit 14 can be inserted into the receiving unit 12.

Figure 3:
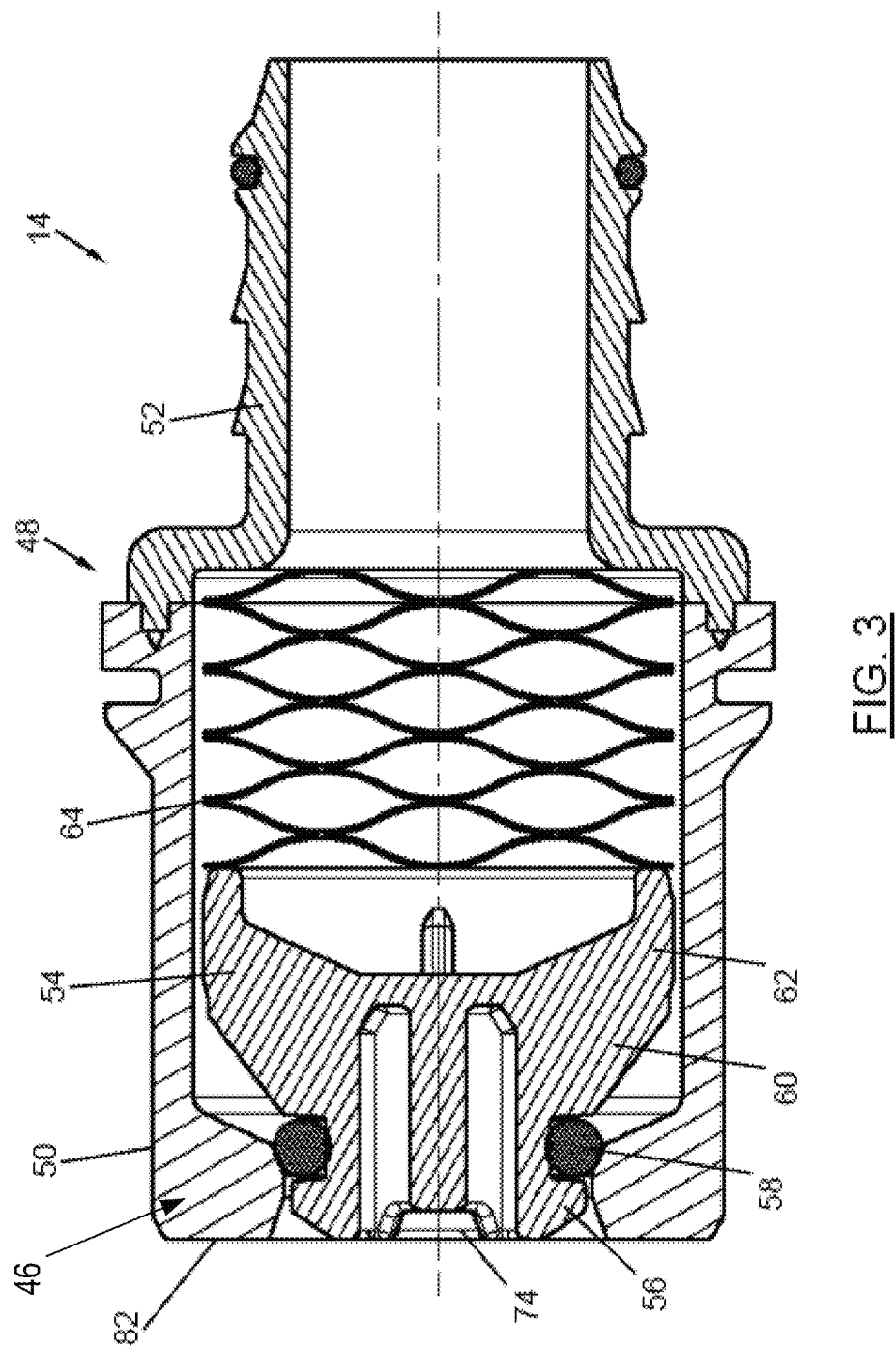
FIG. 3 is a side cross-sectional view of a plug-in unit.

A side cross-sectional view of plug-in unit 14 is shown in FIG. 3. Again, the spring 64 preloads the closure element 54 of the plug-in unit 14 towards the closed position thereof, i.e. into a position in which the sealing element 58 is in contact with the tube-shaped portion 50 of the housing 48 of the plug-in unit 14 such that passage of fluid can be prevented. A bolt-receiving surface 74 is formed on a free end face of the first cylindrical portion 56 of the closure element 54 of the plug-in unit 14 (see the following detailed description of this in relation to FIGS. 4 and 5).

Figure 4:
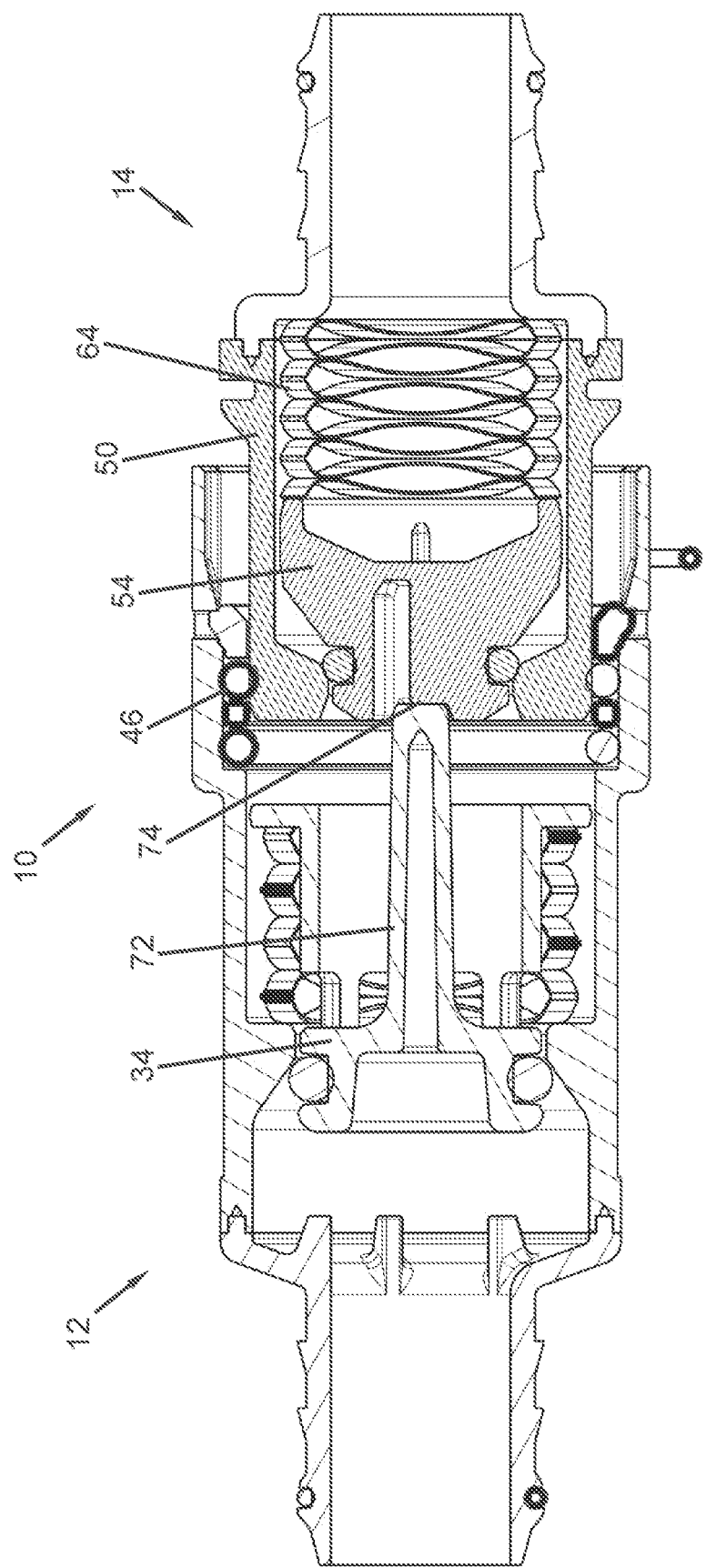
FIG. 4 is a side cross-sectional view of a coupling device according to the invention according to the first embodiment, wherein a flow of fluid is blocked.

FIG. 4 shows the coupling device 10 according to the invention in a partially connected state, namely a state in which the plug-in unit 14 has already been partially inserted into the receiving unit 12 and also an outer circumference of the tube-shaped portion 50 of the housing 48 of the plug-in unit 14 has at least partially come into sealing contact with the sealing device 46 of the receiving unit 12. However, in the partially connected state of FIG. 4, both the closure element 34 of the receiving unit 12 and the closure element 54 of the plug-in unit 14 are still in their respective closed position, so that the passage of fluid through the coupling device 10 is prevented. The central bolt 72 has already come into contact with the bolt-receiving surface 74 of the plug-in unit 14 in FIG. 4.

Figure 5:
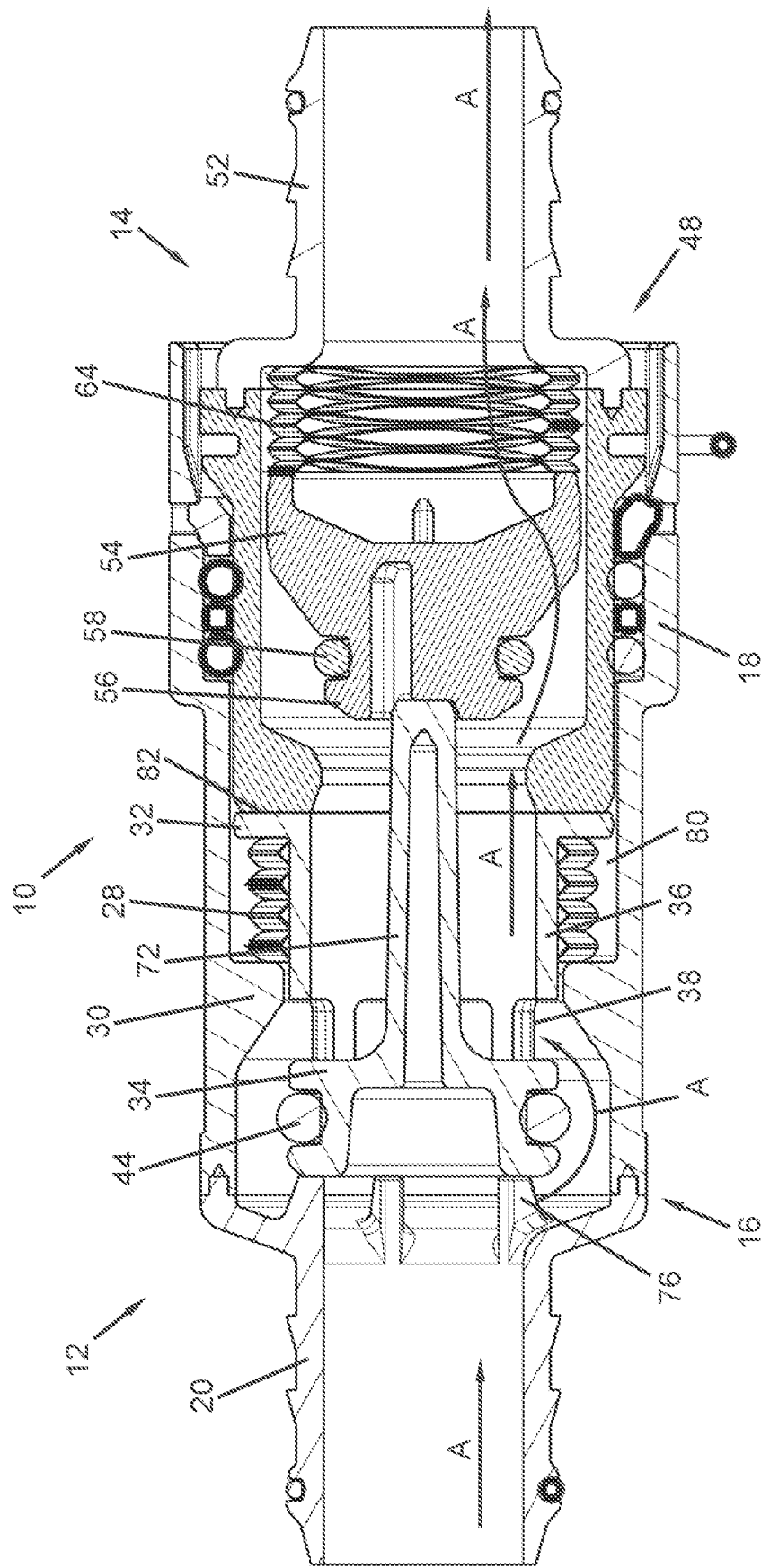
FIG. 5 is a side cross-sectional view of the coupling device according to the invention from FIG. 4, wherein a flow of fluid is allowed.

If the plug-in unit 14 is now displaced further into the receiving unit 12, the completely connected state according to FIG. 5 is reached at the end of this insertion. In FIG. 5, both the closure element 34 of the receiving unit 12 and the closure element 54 of the plug-in unit 14 are arranged in their release position, so that fluid can flow through the coupling device 10 in the fluid flow direction indicated by the arrow A.

Although not shown, it is to be assumed for the embodiment of the coupling device 10 according to the invention shown in the drawings that a spring rate of the wave spring 64 of the plug-in unit 14 is lower than a spring rate of the wave spring 28 of the receiving unit 12, so that, when the plug-in unit 14 is further inserted into the receiving unit 12, according to the position shown in FIG. 4, the wave spring 64 is first compressed and thus the closure element 54 of the plug-in unit 14 is displaced from the closed position thereof into the release position as shown in FIG. 5 by the action of the bolt 72. If the wave spring 64 has reached the maximum compression thereof or if the closure element 54 of the plug-in unit 14 is in contact with a corresponding stop, the further insertion of the plug-in unit 14 into the receiving unit 12 displaces the closure element 34 of the receiving unit 12 from the closed position thereof into the release position. Only at this point in time is the fluid allowed to flow past the sealing element 44, which is arranged on the closure element 34 of the receiving unit 12, and into the plug-in unit 14.

In the release position thereof, the closure element 34 of the receiving unit 12 according to the first embodiment bears against webs 76 which protrude from the closing element 20 of the housing 16 of the receiving unit 12. The release position is defined by the contact between the closure element 34 of the receiving unit 12 and the webs 76.

With reference to the position of the coupling device 10 shown in FIG. 5, the fluid flows through a fluid line (not shown) into the receiving unit 12, i.e. through the fluid flow channel designed inside the closing element 20 of the housing 16 of the receiving unit 12, from there radially outwards between the webs 76 and radially outwards around the sealing element 44 and the corresponding portion of the closure element 34 of the receiving unit 12 (see the curved arrow A in FIG. 5), then the fluid flows radially inwards via the perforations 38 in the closure element 34 of the receiving unit 12 and along the central bolt 72 from the receiving unit 12 into the plug-in unit 14. In the plug-in unit 14, the fluid flows radially outwards around the first cylindrical portion 56 and the sealing element 58 of the closure element 54 of the plug-in unit 14, then through sector-like perforations 78

(see FIG. 1) through the interior of the wave spring 64 and out of the coupling device 10 into a fluid line (again not shown) via a fluid flow channel designed within the closing element 52 of the housing 48 of the plug-in unit 14.

As can be seen in particular from FIG. 5, the spring 28, in the completely connected state of the coupling device 10 shown in FIG. 5, is arranged within a receiving space 80, which is bounded radially inwardly by the cylindrical, perforation-free portion 36 of the closure element 34 of the receiving unit 12, radially outwardly by the tube-shaped portion 18 of the housing 16 of the receiving unit 12, and in the axial direction forwardly and rearwardly by the collar 32 of the closure element 34 of the receiving unit 12 and by the projection 30 of the housing 16 of the receiving unit 12. The wave spring 28 can thus be separated from the fluid flow path when the closure element 34 of the receiving unit 12 is in the release position, so that the discontinuous structure of the wave spring 28 cannot cause any turbulence in the fluid flow that occurs inside the receiving unit 12.

It should be added that, alternatively or in addition to contacting the bolt 72 and the bolt-receiving surface 74, a contact surface 82 (see FIGS. 3 and 5) of the plug-in unit 14, which is formed on the housing 48 of the plug-in unit 14 by way of example in the drawings, can come into contact with a counter-contact surface on the closure element 34 of the receiving unit 12 which is formed on the side of the collar 32 of the closure element 34 opposite the spring 28 in the drawings, in order, upon insertion of the plug-in unit 14 into the receiving unit 12, to cause a displacement of the closure elements 34 and 54.

In the following, with reference to FIG. 6, a second embodiment of a receiving unit 112 according to the invention is described, which is a modification of the previously described receiving unit 12, so that in the further course only the differences to the first embodiment are discussed in more detail and reference is made to the first embodiment with respect to all other features and functions. Accordingly, all features, effects and advantages that are disclosed in relation to the first embodiment of the receiving unit 12 (or the associated coupling device 10) can be applied equally to the second embodiment of the receiving unit 112 (or the associated coupling device 110) and vice versa.

Figure 6:
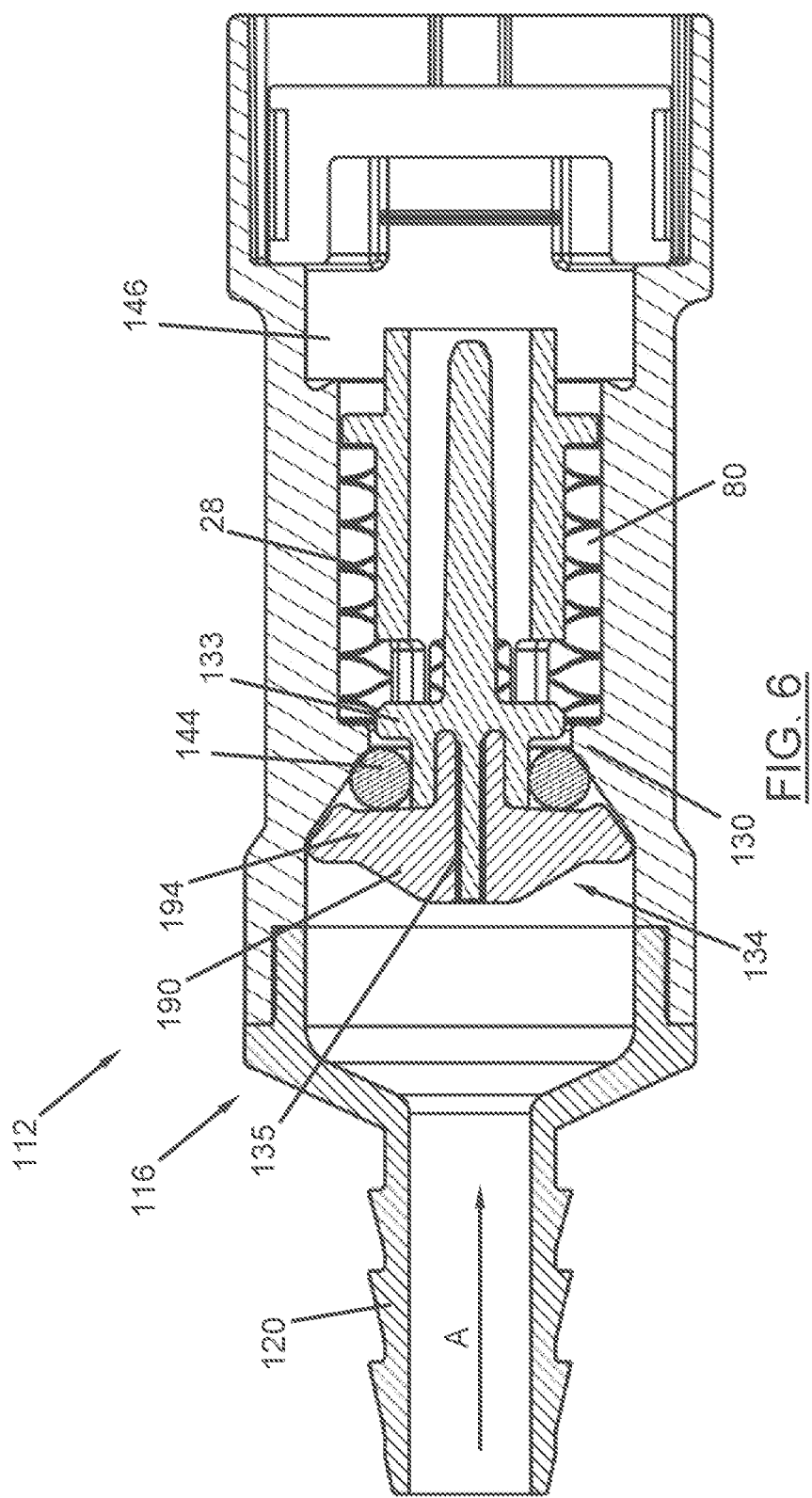
FIG. 6 is a side cross-sectional view of a receiving unit according to the invention according to a second embodiment, wherein a flow of fluid is blocked.

FIG. 6 is a side cross-sectional view of the receiving unit 112 of the second embodiment in an assembled state, with a flow of fluid being blocked in the illustration given. In comparison to the receiving unit 12 of the first embodiment, the closing element 120 of the receiving unit 112 has no groove and no sealing element at the first end thereof, which, however, can optionally be provided. Similar to the sealing device 46 of the first embodiment, a sealing device 146 is also provided in the receiving unit 112 (O-rings and spacers not shown here), which sealing device seals the receiving unit 112 with respect to the plug-in unit 114 from the outside.

The closure element 134 of the receiving unit 112 differs from the closure element 34 of the first embodiment in particular in the multi-part structure thereof. In this case, the closure element 134 comprises internal and external threads arranged parallel to the direction of flow A, which are designated together by the reference numeral 135, via which an end portion 190 of the closure element 134 and a sub-element 133 of the closure element 134 are attached to one another. During the assembly of the closure element 134, the end portion 190 and the sub-element 133 can alternatively or additionally be connected to one another, for example by welding, riveting, caulking, in order to ensure a completely sealed connection between the end portion 190 and the sub-element 133. The end portion 190 has webs 194 extending radially outwards (see FIG. 8), the free ends of which are arranged close to or contact an inner surface of the housing 116. The end portion 190 preferably has at least three webs 194, four webs 194 according to the second embodiment shown here. Arranged on the free ends of the webs 194 are conical surfaces which bear against the housing 116 when the closure element 134 is in the closed position. In this way, it can be avoided that the closure element 134 can be displaced beyond the closed position or that a sealing element 144 is damaged or displaced from the receptacle thereof.

In the closed position of the closure element 134 shown in FIG. 6, the sealing element 144, which is accommodated between the end portion 190 and the sub-element 133, creates a fluidic seal between a flow space upstream of the closure element 134 and a flow space downstream of the closure element 134. The use of the end portion 190 has the further advantage that the webs 194 of the end portion 190 prevent the O-ring 144 from being displaced out of the receptacle thereof.

Figure 7:
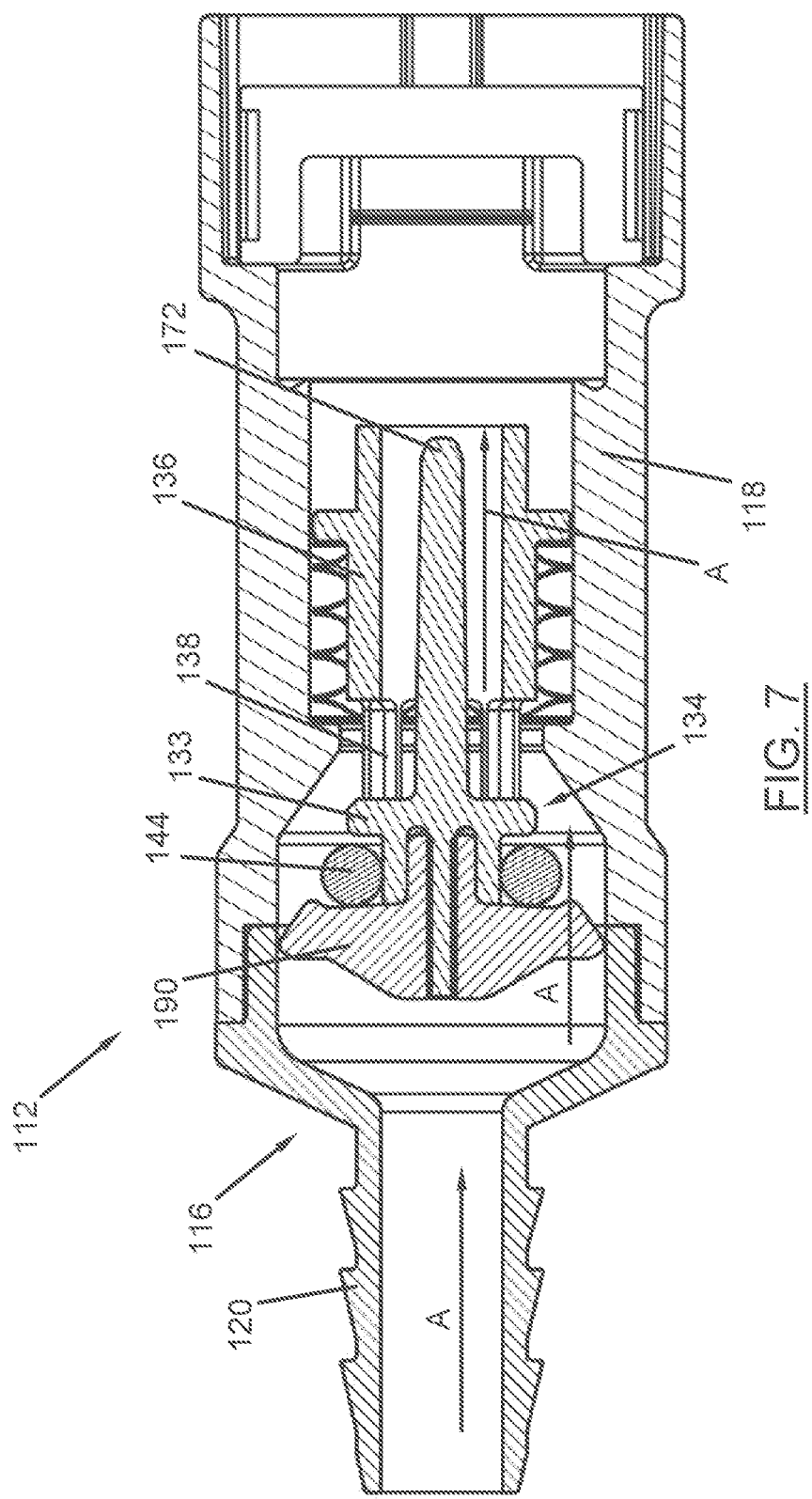
FIG. 7 is a side cross-sectional view of the receiving unit according to the invention from FIG. 6, wherein a flow of fluid is allowed.

Analogous to the release position of the receiving unit 12 described in FIG. 5, the closure element 134 of the receiving unit 112 is shown in the released position in FIG. 7, thereby allowing fluid flow along the direction of flow A along the entire length of the receiving unit 112. In contrast to the first embodiment, no webs 76 are provided in the closing element 120 of the housing 116, since the fluid is conducted through openings 196 (see FIG. 8; not shown in FIG. 7) of the end portion 190. The fluid then flows according to the further course of a tube-shaped portion 118 of the receiving unit 112 radially on the outside around the sealing element 144 and around an immediately adjacent part of the sub-element 133. The fluid reaches radially inwards via perforations 138 and then flows past a central bolt 172 inside a cylindrical portion 136 of the closure element 134. Due to the axial arrangement of the bolt 172, the previously radially running flow is converted into an axially running flow such that undesired turbulence or damming effects are reduced or even avoided. The further course of the fluid takes place within a plug-in unit 114, which is not shown here and is described below.

Figure 8:
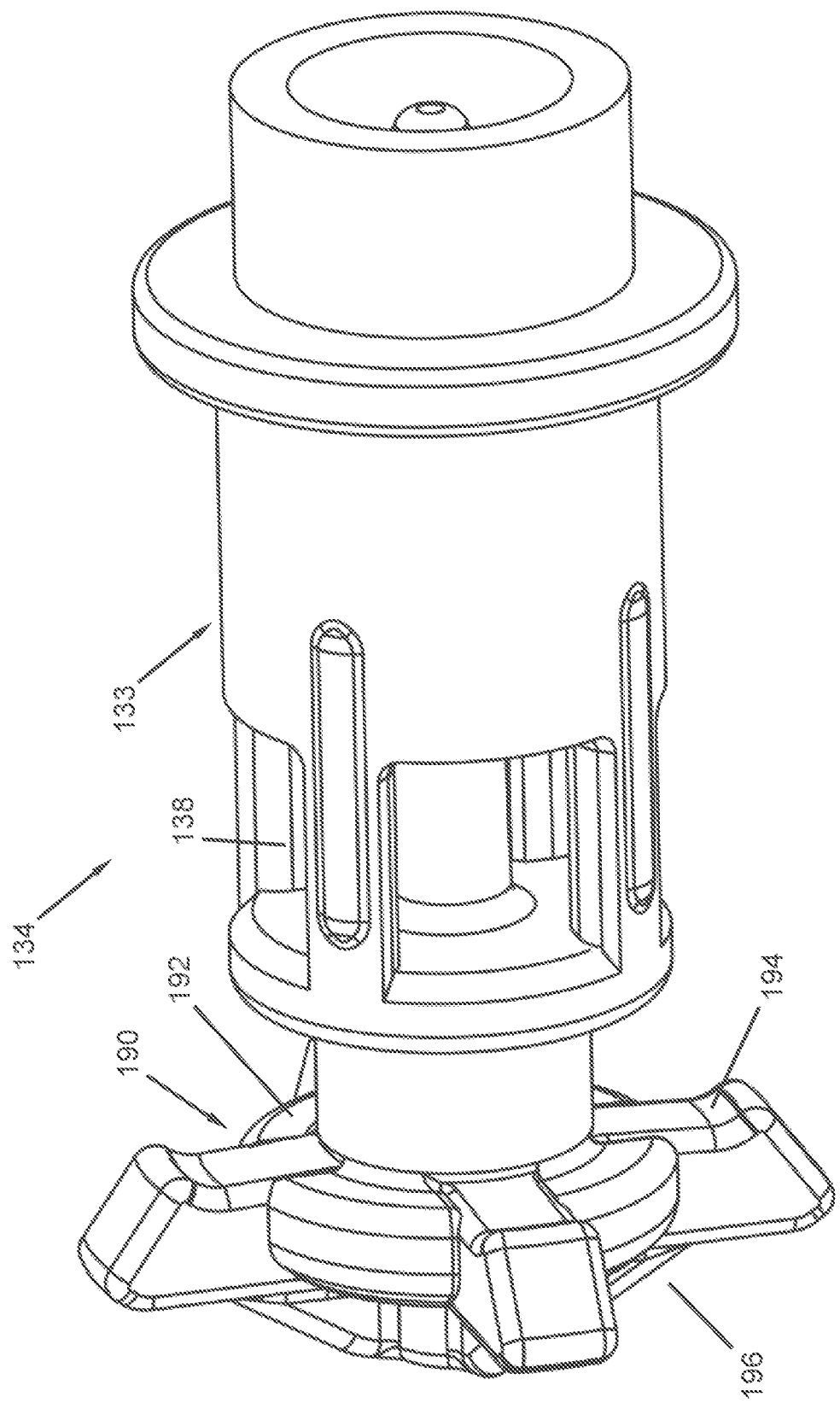
FIG. 8 is a perspective view of a closure element of the embodiment of FIGS. 6 and 7.

FIG. 8 shows a perspective view of the closure element 134, comprising the end portion 190 and the sub-element 133, as already mentioned above. It can be seen here that the end portion 190 comprises a plate-shaped base portion 192 and a plurality of webs 194, here four, protruding radially from the base portion 192. The perforations 196 through which fluid can pass when the closure element 134 is in the release position are provided between the individual protruding webs 194. FIG. 8 also shows the arrangement of the window-like perforations 138 in the sub-element 133, which are designed to establish a fluidic connection between an exterior and an interior of the closure element 134.

Figure 9:
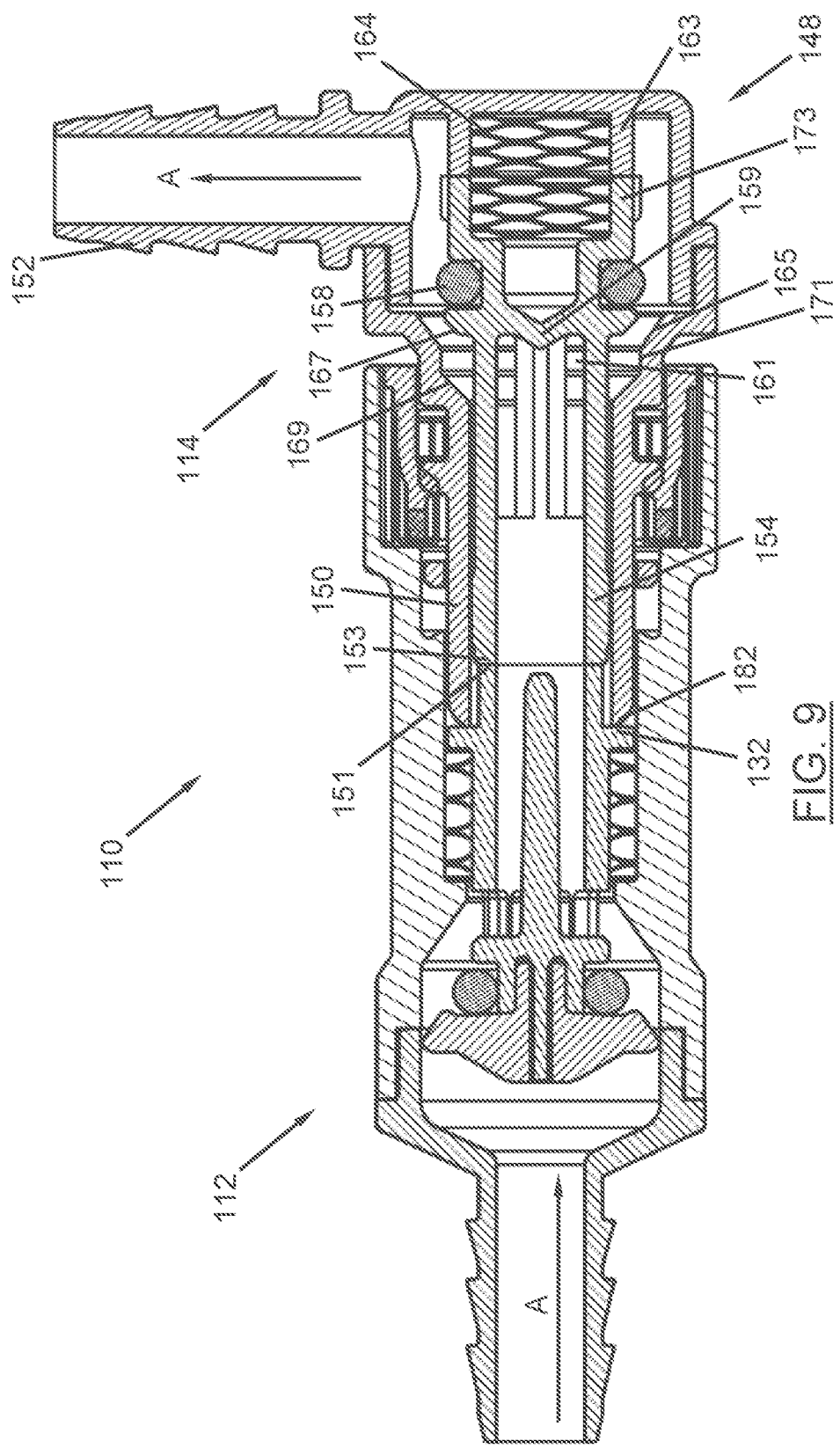
FIG. 9 is a side cross-sectional view of a coupling device according to the invention, based on the receiving unit of the second embodiment and a plug-in unit that fits the receiving unit.

FIG. 9 is a side cross-sectional view of a second embodiment of a coupling device 110 according to the invention. In contrast to the coupling device 10 of the first embodiment, the coupling device 110 has the receiving unit 112 described above and a plug-in unit 114 in which, analogously to the plug-in unit 14, a closure element 154 is accommodated. The housing 148 of the plug-in unit 114 is designed in two parts here, comprising a tube-shaped portion 150 and a further closing element 152, which, analogously to the further closing element 52, can be connected to a fluid line (not shown) and can optionally have sealing elements for this purpose, wherein a fluid outlet (or fluid inlet when the direction of flow is reversed) of the closing element 152 is arranged at an angle, in this case at a right angle, to the longitudinal extent of the coupling device 110. For the sake of completeness, it should be mentioned that, although the plug-in unit 114 is shown at an angle in FIG. 9, this does not necessarily have to be the case. The tube-shaped portion 150 and the further closing element 152 are connected to one another in a fluid-tight manner.

A wave spring 164 is accommodated within the plug-in unit 114 and preloads the closure element 154 of the plug-in unit 114 into the closed position thereof. The wave spring 164 is held in a spring receptacle 163, which is formed integrally with the further closing element 152 and protrudes in the interior thereof in the shape of a ring. During the displacement of the closure element 154 from the release position thereof to the closed position thereof, a sealing element 158, which is accommodated radially on the outside on the closure element 154 of the plug-in unit 114, first comes into contact with a tapering contact surface 165, as a result of which the sealing element 158 is compressed radially inwards. Due to the action of the wave spring 164, the closure element 154 is displaced further until a stop surface 167 of the closure element 154 strikes against a counter stop surface 169 which is designed on the housing 148 of the plug-in unit 114. The closed position of the closure element 154 is thus defined by the contact of the stop surface 167 and the counter stop surface 169. In this closed position, the sealing element 158 rests against a cylindrical sealing surface 171, the resilient restoring force of the sealing element 158, which acts substantially orthogonally to the sealing surface 171, supporting the sealing effect. A cylindrical sealing surface of this type can of course be provided analogously on the receiving unit, which interacts with the sealing element 144.

The connection process of the coupling device 110 will now be described in more detail below. If the plug-in unit 114 is inserted into the receiving unit 112, a contact surface 151 of the closure element 134 of the receiving unit 112 first contacts a counter-contact surface 153 of the closure element 154 of the plug-in unit 114. During further insertion of the plug-in unit 114 into the receiving unit 112, at least one of the two closure elements 134, 154 is displaced from the closed position thereof towards the release position thereof, depending on the design of the spring forces of the wave springs 28, 164. In the example shown in FIG. 9, the spring force of the wave spring 164 is less than the spring force of the wave spring 28, so that the closure element 154 of the plug-in unit 114 is first displaced from the closed position thereof into the release position thereof. A contact surface 132 of the closure element 134 of the receiving unit 112 then contacts a counter-contact surface 182 of the housing 148 of the plug-in unit 114, as a result of which the closure element 134 is also displaced from the closed position thereof towards the release position thereof.

If a fluid now flows from the receiving unit 112 shown on the left in FIG. 9 along into the plug-in unit 114, the fluid is deflected radially outwards by a wedge-shaped base 159 and then passes through openings 161 into the closing element 152 of the plug-in unit 114. In the release position of the closure element 154, a ring-shaped spring receptacle portion 173 of the closure element 154, in which that free end of the wave spring 164 which is not accommodated in the spring receiving portion 163 is accommodated, contacts the spring receiving portion 163 or is at least arranged adjacent thereto, thereby defining the release position of the closure element 154. Due to the contact or close proximity of the two ring-shaped parts, namely the spring receptacle 163 and the spring receptacle portion 173, the wave spring 164 is taken out of contact with the fluid flowing past, so that, by not allowing the fluid to contact the wave spring 164, turbulence in this region of the plug-in unit 114 is minimised and no fluid build-up can occur on the wave spring 164.

The closure element 154 is guided at the free end thereof, shown on the left in FIG. 9, over a radial thickening inside the tube-shaped portion 150 of the housing 148.

A latching device 175 is formed radially on the outside of the closure element 154 of the plug-in unit 114 and is designed to latch on the receiving unit 112 in order to prevent unwanted decoupling between the receiving unit 112 and the plug-in unit 114.

The invention claimed is:

1. A receiving unit of a coupling device for fluid lines, wherein the receiving unit is designed to be connected at a first end to a fluid line, which does not belong to the receiving unit, and defines a fluid flow channel in an interior of the receiving unit, the receiving unit comprising:
   a closure element that is displaceable between a closed position and a release position, wherein the closure element, in the closed position, is designed to fluidically seal the fluid flow channel of the receiving unit between the first end and a second end of the receiving unit, the second end being opposite the first end in relation to a main flow direction along the fluid flow channel,
   wherein the closure element is preloaded into the closed position using a spring element,
   wherein the closure element comprises a substantially cylindrical portion which is free of perforations,
   wherein an entirety of the spring element, in the release position of the closure element, is arranged within a region, which is completely overlapped by the cylindrical portion along an entire longitudinal extent of the cylindrical portion as viewed in a radial direction of the cylindrical portion, and
   wherein the closure element further comprises a section provided with perforations, wherein the perforations of the section are formed as openings which fluidically connect an interior of the closure element to an exterior of the closure element;
   wherein a counter-contact surface of the closure element of the receiving unit is configured as a collar protruding from the closure element of the receiving unit in the radial direction; and
   wherein the closure element of the receiving unit comprises a central bolt having a free end which extends in the direction of the second end of the receiving unit, and which is designed to rest against a bolt-receiving surface formed on a closure element of a plug-in unit upon insertion of the plug-in unit into the receiving unit, so that, when the insertion of the plug-in unit is continued into the receiving unit, the closure element of the plug-in unit or the closure element of the receiving unit is displaced from the closed position of the closure element in the direction of the release position.

2. The receiving unit of claim 1, wherein the spring element comprises a wave spring.

3. The receiving unit of claim 1, wherein the spring element is arranged radially outside of the cylindrical portion.

4. The receiving unit of claim 1, wherein the perforations of the section are configured as four openings.

5. The receiving unit claim 1, wherein the receiving unit comprises a housing in which the closure element is accommodated, wherein the housing comprises a radially inwardly extending projection, wherein the projection is designed to come into contact with the closure element in the closed position of the closure.

6. The receiving unit according to claim 5, wherein the projection is provided with an oblique flank, such that the projection results in a gradually reducing cross section of an interior of the housing in a direction from the release position into the closed position of the closure element.

7. The receiving unit of claim 5, wherein at least one protruding web is arranged on the housing, wherein the at least one protruding web is configured to define the release position of the closure element in contact with the closure element.

8. The receiving unit of claim 5, wherein the projection is designed to come into contact with a sealing element arranged on the closure element.

9. The receiving unit according to claim 5, wherein the housing of the receiving unit is configured in multiple parts.

10. The receiving unit of claim 9, wherein the multiple parts comprise two parts.

11. The receiving unit of claim 9, wherein a first housing part comprising the first end is connected in a fluid-tight manner to a second housing part comprising the second end.

12. The receiving unit of claim 11, wherein the first housing part is connected to the second housing part using a spin welding process or a laser welding process.

13. A coupling device for fluid lines, comprising:
a receiving unit designed to be connected at a first end to a fluid line which does not belong to the receiving unit, the receiving unit defining a fluid flow channel in an interior of the receiving unit, the receiving unit comprising:
a closure element that is displaceable between a closed position and a release position,
wherein the closure element, in the closed position, is designed to fluidically seal the fluid flow channel of the receiving unit between the first end and a second end of the receiving unit, the second end being opposite the first end in relation to a main flow direction along the fluid flow channel,
wherein the closure element is preloaded into the closed position using a spring element,
wherein the closure element comprises a substantially cylindrical portion which is free of perforations,
wherein an entirety of the spring element, in the release position of the closure element, is arranged within a region, which is completely overlapped by the cylindrical portion along an entire longitudinal extent of the cylindrical portion as viewed in a radial direction of the cylindrical portion, and
wherein the closure element further comprises a section provided with perforations, wherein the perforations of the section are formed as openings which fluidically connect an interior of the closure element to an exterior of the closure element;
a plug-in unit configured to be connected at a first end to a further fluid line, which does not belong to the plug-in unit, wherein the plug-in unit defines a fluid flow channel in an interior of the plug-in unit, wherein the plug-in unit comprises a contact surface configured to come into contact with a corresponding counter-contact surface of the closure element of the receiving unit when the plug-in unit is inserted into the receiving unit, so that, when the insertion of the plug-in unit is continued into the receiving unit, the closure element of the receiving unit is displaced from the closed position of the closure element in the direction of the release position;
wherein the counter-contact surface of the closure element of the receiving unit is configured as a collar protruding from the closure element of the receiving unit in the radial direction;
wherein the closure element of the receiving unit comprises a central bolt having a free end which extends in the direction of the second end of the receiving unit, and which is designed to rest against a bolt-receiving surface formed on a closure element of the plug-in unit upon insertion of the plug-in unit into the receiving unit, so that, when the insertion of the plug-in unit is continued into the receiving unit, the closure element of the plug-in unit or the closure element of the receiving unit is displaced from the closed position of the closure element in the direction of the release position; and
a sealing device arranged on one or more of the receiving unit or the plug-in unit the sealing device being configured between the receiving unit and the plug-in unit such that the fluid flow channel of the one or more of the receiving unit or the plug-in unit is fluidically sealed from an exterior of the coupling device, wherein the sealing device is arranged such that a fluidic seal is established between the receiving unit and the plug-in unit before the contact surface of the plug-in unit comes into contact with the counter-contact surface of the closure element.

14. The coupling device of claim 13, wherein in a closed position
the closure element is designed to fluidically seal the fluid flow channel of the plug-in unit between a second end of the plug-in unit, the second end being opposite the first end in relation to a main flow direction along the fluid flow channel and the first end;
wherein the closure element of the plug-in unit is displaceable between the closed position and a release position; and
wherein the closure element of the plug-in unit is preloaded into the closed position using a spring element.

15. The coupling device of claim 13, wherein the closure element
of the plug-in unit has an increasing diameter in a direction from the second end of the plug-in unit to the first end of the plug-in unit.

16. The coupling device of claim 13, wherein a spring force
of the spring element acting on the closure element of the plug-in unit is lower, than a spring force of the spring element acting on the closure element of the receiving unit, so that, when the plug-in unit is inserted into the receiving unit, the closure element of the plug-in unit is first displaced from the closed position of the closure element into the release position of the closure element and subsequently, when the plug-in unit is further inserted into the receiving unit, the closure element of the receiving unit is displaced from the closed position of the closure element into the release position of the closure element.

17. The coupling device of claim 13, wherein the free end of the central bolt is designed to rest against the bolt-receiving surface formed on the closure element of the plug-in unit.

* * * * *